W. J. PERKINS.
AUTOMATIC LIQUID FUEL CONTROL FOR BURNERS.
APPLICATION FILED SEPT. 5, 1913.
1,115,014.
Patented Oct. 27, 1914.
3 SHEETS—SHEET 1.
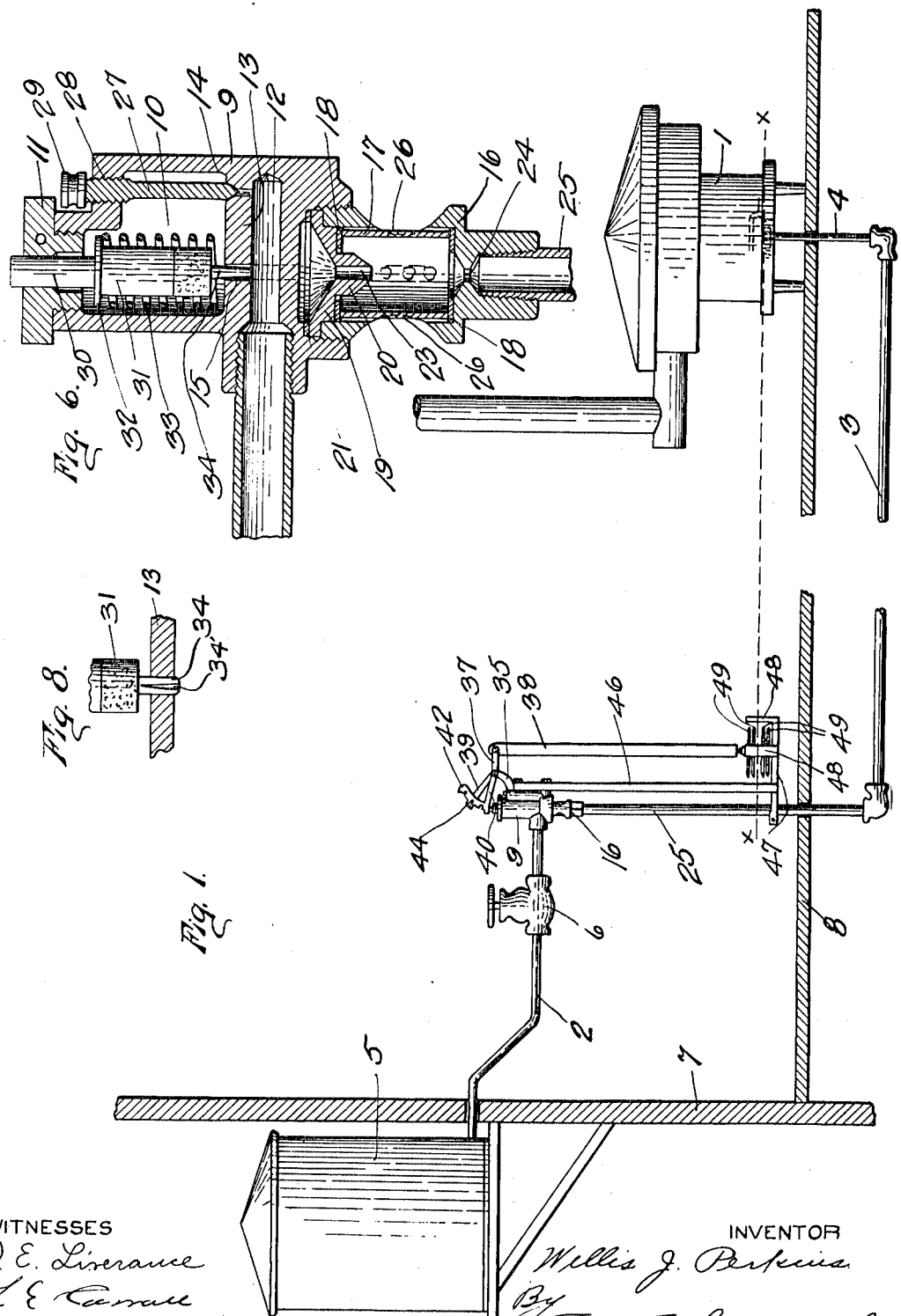

W. J. PERKINS.
AUTOMATIC LIQUID FUEL CONTROL FOR BURNERS.
APPLICATION FILED SEPT. 5, 1913.
1,115,014.
Patented Oct. 27, 1914.
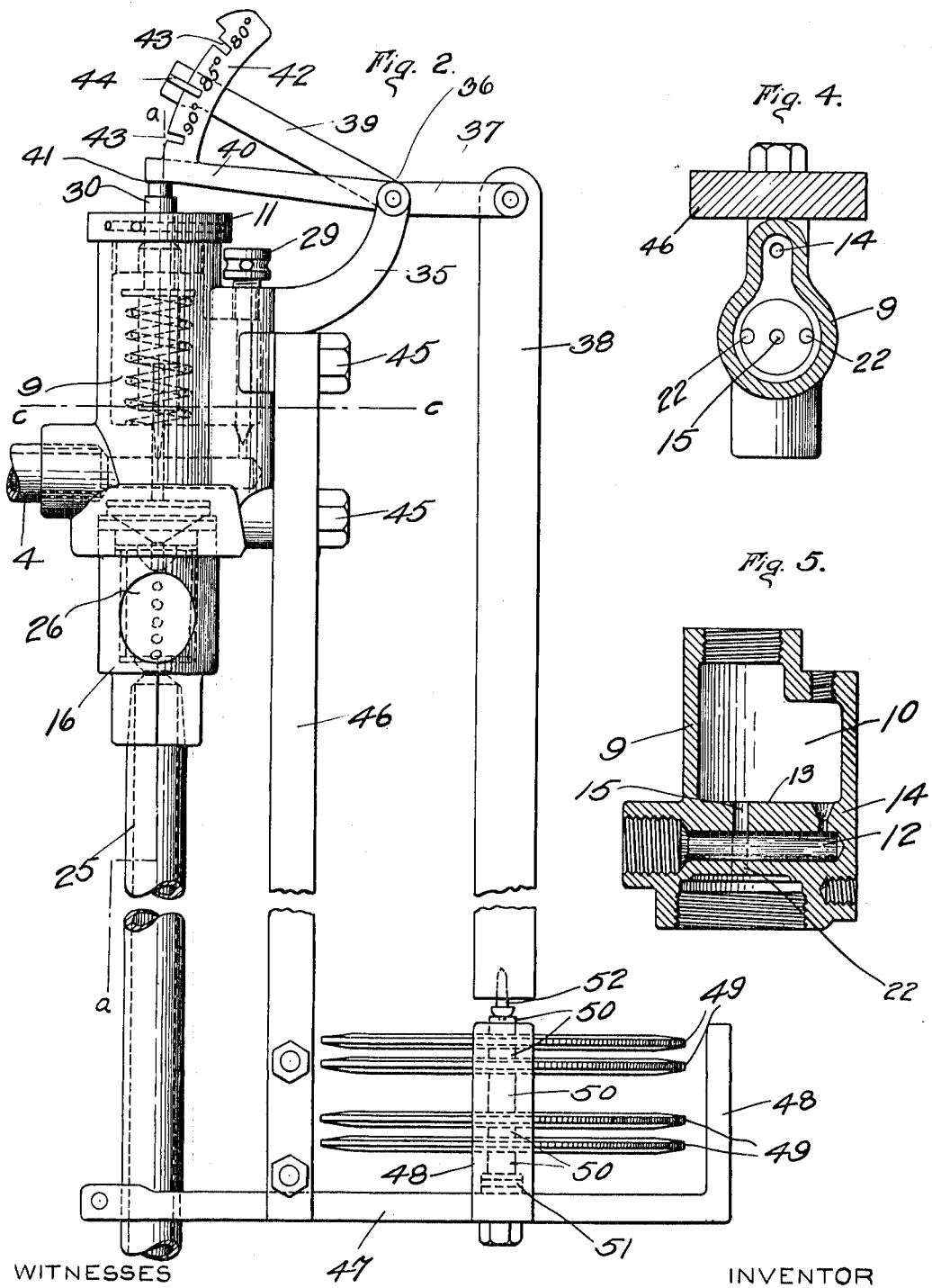

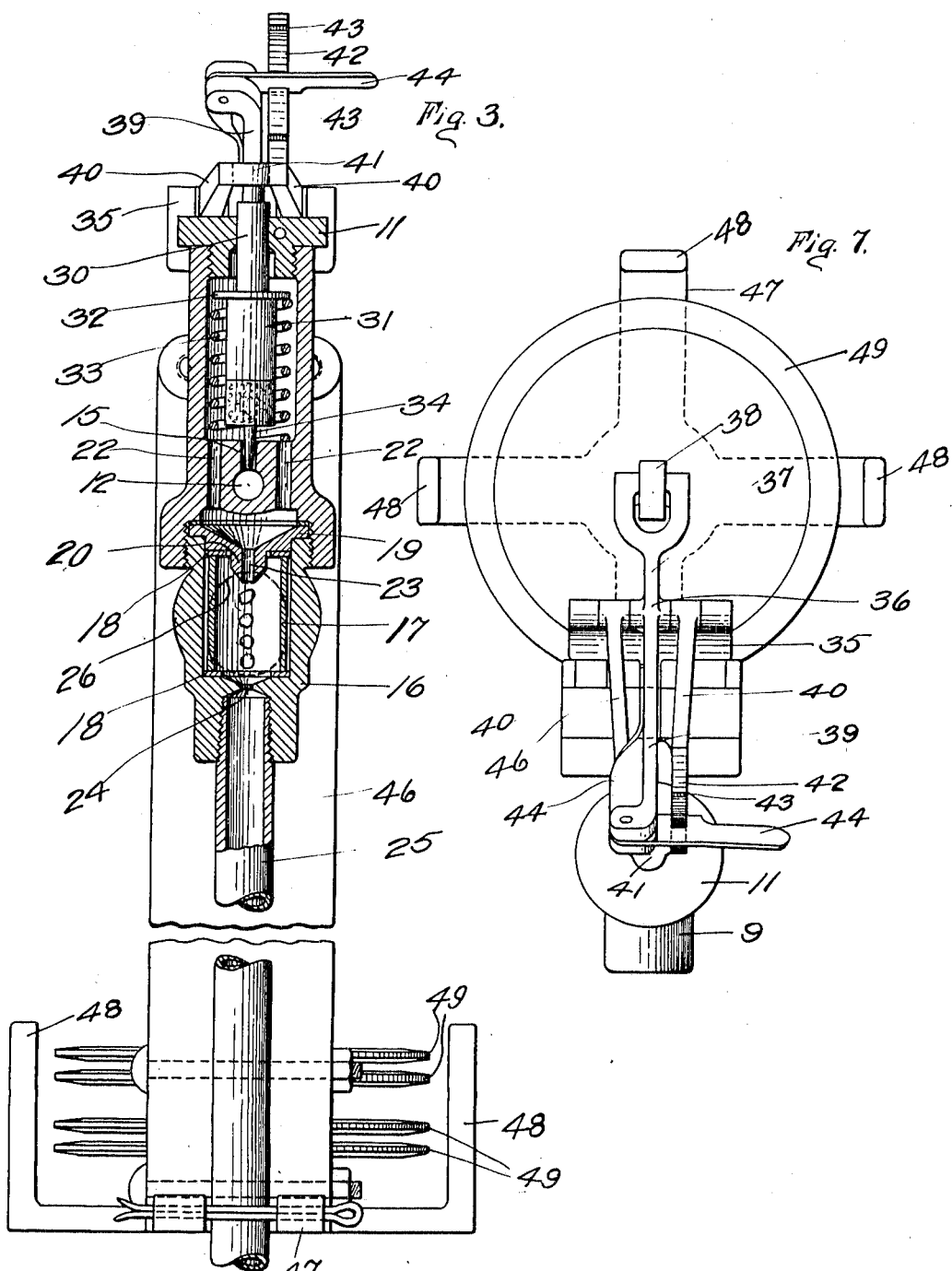

UNITED STATES PATENT OFFICE.

WILLIS J. PERKINS, OF GRAND RAPIDS, MICHIGAN.

AUTOMATIC LIQUID-FUEL CONTROL FOR BURNERS.

1,115,014. Specification of Letters Patent. Patented Oct. 27, 1914.

Application filed September 5, 1913. Serial No. 788,217.

*To all whom it may concern:*

Be it known that I, WILLIS J. PERKINS, a citizen of the United States, and a resident of the city of Grand Rapids, in the county of Kent and State of Michigan, have invented a certain new and useful Automatic Liquid-Fuel Control for Burners, of which the following, taken in connection with the accompanying drawings, is a specification, a preferred construction, and the operation of same.

This invention relates to liquid fuel control mechanisms for burners in stoves or heaters using liquid fuel. Such heaters may be used to warm the air and increase the temperature thereof in a room or building and it is with such conditions that my invention is designed to be used.

It is the primary object of my invention to so control the supply of fuel to the burner that the supply shall not exceed the consuming capacity of the burner, that the temperature of the room or building shall not vary materially from a certain predetermined degree, and to this end I have provided a fuel control mechanism and located it in the conduit leading from the fuel supply to the burner and constructed it in such manner that the temperature of the room or building at the service level in which it is placed serves to automatically increase or decrease a variable supply of fuel to the burner in accord with the fall or rise of temperature of the room or building at the service level at which the device is located.

A further object of the invention is to provide a regulator or control of this nature in which the fuel supplied to the burner may be seen and its amount gaged from actual visual inspection.

A still further object is to provide the fuel control with a continuously operating pilot feed or minimum supply of fuel to the burner so that under no conditions can the burner become extinguished.

It is purposed in this invention also, to have a means of selecting different temperature conditions to be attained in the room or building and to provide means for manually shifting the automatic fuel control to predetermined adjustments to maintain such selected degree of temperature.

Furthermore it is an object of this invention to provide a fuel control automatically operated by reason of variations in temperature at service level and so construct the device that the thermostat or temperature regulator may be located at any desired height or level above the floor of the room so as to be controlled or affected by the service strata temperature at the level in the room at which it is placed. This is especially desirable in one of the places where my invention will be most extensively used, namely, in brooders for chickens or other species of birds, in which the chickens or other young birds will always be on the floor of the brooder room or building, and it is very desirable that the temperature of the same at the service level in which the chickens live shall be uniformly maintained at a predetermined degree.

A further object of the invention is to so protect the fragile parts of the mechanism that they will be safeguarded in transportation, installation and use, thereby permitting the device to be shipped assembled and adjusted.

Various other objects and purposes than those specifically enumerated will be evident as understanding is had of the construction outlined in the drawings which show one embodiment of the invention and in which, Figure 1 is a side elevation of my invention applied in working order to a burner, the room in which it is placed being partially shown in section. Fig. 2 is a side elevation of the automatic fuel control device. Fig. 3 is a vertical section thereof on line *a—a*, Fig. 2. Fig. 4 is a section taken on line *c—c*, Fig. 2. Fig. 5 is a vertical section through the casing which includes the immediate fuel control mechanism, such mechanism being removed. Fig. 6 is a similar view with the mechanism retained. Fig. 7 is a plan view of the fuel control device. Fig. 8 is a modification in detail of the valve pin used in the control mechanism.

Similar reference numerals refer to similar parts throughout the several views of the drawing.

In the embodiment shown of my invention it is shown as applied to the burner of a brooder stove, said stove 1 being of any desired kind or type, the fuel therefor being supplied through pipes 2, 3 and 4 from the fuel supply reservoir 5. The fuel used may be kerosene oil though the invention is not in any manner limited in use to any particular fuel oil. The fuel control is located between pipes 3 and 4 and has attachment therewith as shown, and in pipe 2 there is provided the usual valve 6 for cutting off or turning on the supply of fuel. The reservoir is shown as located above the fuel control and the stove burner, this indicating that the fuel flows by gravity through the control to the burner. Either a pressure tank or one located so that the fuel flows by gravity is equally adaptable and useful.

A fragmentary portion of the side of the brooder is indicated at 7 in section and a similar portion of the floor at 8. It will be seen that the fuel control is preferably placed in proximity to the floor or service level when used in connection with brooder houses, the reason therefor being evident. With the use of the invention in rooms of other character, the position of the fuel control will be governed by which section, level, or strata of air of the room it is desired shall have a certain predetermined temperature. In brooder rooms the strata or level of air in which the chicks live is the one in which the temperature must be regulated, and the position of the fuel control, accordingly, must be near the floor, varying only with the different sizes of chicks for different species of fowls or birds housed therein. The pipe 2 from the fuel supply reservoir leads into the casing 9 which may be a metallic casting having an upper chamber 10 closed by a threaded cap 11, and further provided with an inlet chamber 12 under the upper chamber, the partition or section 13 lying between said chambers. Said partition is pierced at 14 and 15 to make communicating passages between chambers 10 and 12. The pipe 2 has communication with chamber 12, it being attached to the casing by screw threads or other suitable connection so as to empty into the chamber 12. The lower portion of casing 9 is bored and threaded to receive the threaded end of member 16 which is interiorly hollowed out for a portion of its length so as to receive the section of glass tubing 17. A pair of gaskets 18 may be placed at either end of tube 17, and above the upper of such gaskets may be placed the cup-like member 19, the projection 20 of which extends a short distance into the tube 17. A gasket 21 is located above the member 19 so that when member 16 is inserted into the lower threaded portion of casing 9, it bears snugly thereagainst and retains the members within member 16 firmly in place. Between upper chamber 10 and the lower hollowed out portion of casing 9 two holes 22 are drilled or otherwise suitably formed so that any fuel passing through openings 14 and 15 to the upper chamber will drop through said opening 22 to the cup member 19, thence through the opening 23 in projection 20 thereof through tube 17, thence through opening 24 formed in the member 16 as shown into tube 25 which is suitably connected to the lower end of such member at one end and at the other has communication with tube 3 leading to the burner. The upper part of the member 16 is cut away where it surrounds the glass tube 17 so that it is possible to see all the fuel which passes through the tube and off the end of the dropper projecting downwardly into the tube, these sight openings in member 16 being indicated at 26 as opposed to each other in the member.

With the construction so far described, it is evident that if some means was not used to control the flow of the fuel through openings 14 and 15, there would be a continual and steady passage of the fuel through said openings to the upper chamber 10, thence through openings 22 to the lower member 16 and through the passages 23 and 24 noted to the tubes leading to the burner. There is provided, however, a valve 27 having a tapered lower end which is adapted to bear against the tapering seat formed at the upper portion of opening 14 and said valve is adapted to be manually adjusted relatively to the seat through the screw connection shown at 28. Such valve is adjustable within a limit defined by the head 29 thereof engaging or contacting against cap 11, so that too great a supply of fuel is precluded from passing through opening 14. This pilot feed is for the purpose of continuously supplying a limited amount of fuel to the burner so as to prevent the extinguishing of the burner should the supply of fuel through the variable supply valve opening at 15 be automatically closed as hereafter described.

Extending through the cap 11 is the valve stem 30 which within the chamber 10 may be enlarged as at 31 and be provided with an enlarged ring or ledge 32 against which the upper part of the valve opening spring 33 bears, the lower end seating against the lower wall of chamber 10. The valve 31 may be of any suitable material but at its lower end it is preferably formed of cork or other similar material to form a fuel tight seat against the bearing wall of chamber 10 when the supply of fuel through opening 15 is to be automatically entirely cut off. A suitably formed valve member 34 is inserted in the opening 15, and is attached to or formed integral with the valve member 31. This valve member 34 may be of various formation, tapered as shown in Fig. 6, or it may be provided with upwardly tapering slots as shown at 34' in Fig. 8. It is evident that with either of these constructions as the valve member 34 is automatically inserted farther into the opening 15, the supply of fuel is rendered less and as it is withdrawn the flow increases, and that the normal tendency of spring 33 is to elevate the valve member 34 and allow the maximum supply of fuel to flow through the opening 15.

As one means of regulating and controlling the position of the valve member 34 within the opening 15, I have provided the following structure. There may be interally formed with the casing 9 the arm 35 which at its outer end carries the lever 36 pivotally mounted. The lever is pivotally mounted between its ends, one arm 37 of the lever extending from the pivotal point and having pivotal attachment with the upright 38, and the other arm 39 extending in the opposite direction and upwardly at an incline as shown in Fig. 2. Pivotally mounted also at the end of the arm 35 are a pair of arms 40 which may be connected at their free ends by a cross member 41 which normally rests upon the upper end of the valve member 30. An arm 42 formed in a curve the center of which is at the point of pivotal connection at the end of arm 35 is attached either integrally or in other suitable manner to one of the arms 40 and on its outer edge may be provided with a series of notches 43 in which may be seated the spring catch and shifting handle member 44 which is pivotally connected to the end of arm 39. By adjusting the relation of arms 40 and 39 to each other through this locking mechanism, the degree of temperature at which the thermostat, hereafter described, begins to automatically act on the valve members 34 is determined. I have shown but three degree regulating notches one being marked 80 degrees, another 85 degrees, and the third 90 degrees. This is the standard range of adjustment necessary in ordinary chicken brooders, but it is clear that the invention is not limited to any specific number of adjustments and that the degree of temperature difference may be varied to suit the condition desirable to be secured, as for instance, with other than chickens housed in the brooder.

Secured by set screws 45 or other suitable means to the casing 9 is the depending upright member 46 which extends downwardly for a distance parallel to the pipe 25 and at its lower end carries the member 47 which may be positioned horizontally and at one end be divided to receive and embrace the pipe 25 as shown. At the other side of the upright 46, member 47 may be fashioned into a cross each arm thereof and the extension beyond the cross being provided with upstanding extensions 48 which serve as guards in transporting, assembling, or in service for the thermostatic wafers 49 located between such guards. For the purpose of securing greater accuracy of control, I have provided four of such wafers but it is evident that the number may be varied at will, as also may be the leverage in arms 37 and 39, and the wafers may be positioned one above the other with connecting columns 50 in between and above and below the upper and lower of such wafers, the lower wafer of the lower column resting on removable regulating and adjusting washers or other suitable supports 51 which in turn are supported by the member 47. Inserted in the lower end of the upright 38 is the round headed brad 52 which may be seated in the hollowed out upper end of the column 50. The thermostatic wafers are of usual and ordinary standard construction and are adapted with the rise of temperature to expand, increasing the distance between their sides uniformly with the temperature increases, and to contract and decrease such distance uniformly with uniform fall in temperature. While I have shown the thermostatic wafers as a ready and convenient structure for performing the functions described, it is evident that any temperature expanding and contracting medium that is suitable for actuating the automatic valve mechanism may be substituted for the wafers 49 in this, my preferred construction.

The operation of the above described structure will now be set forth, especially in its relation to brooders and brooder rooms. Upon lighting the stove, the valve 6 is operated to allow the fuel to enter the chamber 12, upon which it will pass through openings 14 and 15 and thereafter through the previously defined passages to the burner of the stove where the fuel is consumed. It is evident that with the room at the ordinary temperature before lighting the stove, the wafers will be collapsed and the upright 38 lowered, thus lowering arm 37 and elevating arms 39 and 40 so that a maximum passage of fuel through opening 15 will be permitted, together with the minimum flow through opening 14. The arm 39 may be placed in either of the three positions with reference to arms 40 and during the first week after hatching the temperature should, preferably, be 90 degrees Fahrenheit, and, accordingly, the member 44 should be located in the lowermost notch 43 on the arm 42. With the rise of temperature in the brooder, wafers 49 expand, elevating the upright 38 and thus operating to force the valve member 34 into the opening 15. With a properly constructed and empirically adjusted device of this character, with the member 44 located in the lowest notch 43, when the temperature of the room reaches 90 degrees, the valve member 34 will be entirely inserted in opening 15 and the cork seat of valve member 31 will seat against the wall of chamber 10 cutting off any further passage of fuel except through pilot opening 14 which is to prevent the burner becoming extinguished from lack of fuel. The cork or valve seat end of valve member 31 forms a liquid tight seat preventing the escape of any fuel. Upon a decrease of the room temperature the wafers 49 contract, this allowing spring 33 to raise the valve member 34 and permitting the passage of more fuel to the burner. In this manner the temperature is held at practically a predetermined degree regardless of the outside temperature and without attention from an attendant, the fuel control automatically regulating the fuel supply so as to keep the temperature constant. It will be noted in this connection that the wafers 49 are located in proximity to the floor of the brooder room and that they are adapted to govern the fuel supply through the temperature which the brooder room has at substantially the level in the room where the chicks live and move. It will also be noted that the fuel passing through pipes 4, 3 and 25 to the burner will be maintained by the stove consumption at the level of the burner overflow surface substantially on the line $x—x$ of Fig. 1 so that the fuel from the fuel control will drop freely through an air space in the pipe 25, this being important in permitting visual examination of the feed of the fuel through the sight feed gage at 26. By noting the amount or number of drops of fuel falling through the glass tube for a given interval of time and comparing it with what has been experimentally determined to be the proper flow for a required temperature in the brooder room, it is easy to regulate the minimum flow to proper amount through manual adjustment of the pilot feed device 27, and in any change of the pilot feed relatively with the automatic feed it is very important to know what is the result thereof. The sight feed permits this and is an important feature of the invention. In order to have this sight feed there must be an open space for the fuel to freely fall in the pipe 25 and the fuel control mechanism must be placed a distance above the horizontal plane of the burner. For the purpose of locating the thermostatic wafers at the living level of the chicks, the uprights 38 and 46 are of considerable length, but it will be noted that they are of substantially the same length so that any temperature changes affecting them will affect them equally. Such members are also, preferably, of wood which is not greatly affected physically by temperature changes or climatic conditions.

It has now become the practice in raising large numbers of chickens to hatch them artificially in incubators and subsequently care for them in brooder rooms or houses heated to proper temperature by separate brooder stoves. Brooder rooms are large and roomy and give the chickens the required amount of light, air and ventilation and the problem is to keep them at the proper degree of temperature. For a week after hatching the proper temperature according to authority should be 90 degrees, the next week or perhaps a little longer it should be 85 degrees and thereafter eighty degrees. If these temperatures are maintained, it is claimed that 80 to 90 per cent. of the chickens may be raised and the loss is very low under the system stated. With my automatic regulator and manual control of the fuel to the stove, whereby the burner can never become extinguished so long as there is fuel in the reservoir, and where the temperature affecting the fuel control means is that of the level of the brooder room or house at which the chickens live, the problem of properly controlling the temperature of the brooder room or house is solved, and the per cent. of loss in rasing the chickens is lessened proportionately.

I have described a complete and practically operative device as one embodiment of my invention. Various other embodiments and modifications have occurred to me and will occur to others skilled in the art upon knowledge being had of the invention. I, accordingly, do not consider the specific embodiment herein shown and described as comprehending my full invention, but consider myself as entitled to all modifications in structure conforming to the principles and spirit of the invention as set forth in the appended claims.

What I claim as new and desire to secure by Letters Patent is:—

1. In a mechanism of the character described, a burner, a source of liquid fuel supply, a liquid fuel control device interposed between the burner and fuel supply, said control device including means to manually regulate the supply of fuel passing to the burner and means to automatically control and regulate additional fuel supply through temperature changes, and connections joining the source of fuel supply, fuel control device and burner, said connections including a conduit between the fuel control device and burner, a section adjacent the fuel control device being located above the burner and normally unfilled with liquid fuel.

2. In a mechanism of the character described, a burner, a source of liquid fuel supply, a dual liquid fuel control device receiving fuel from the source of fuel supply through pressure, connections leading from the source of fuel supply to the fuel control device and therefrom to the burner for conducting the fuel, said connections between the dual fuel control device and burner including a section normally filled with fuel and a second section through which the fuel drops freely from the fuel control device through gravity, and means included in the fuel control device for regulating the supply of fuel to the burner through dual control means.

3. In a mechanism of the character described, a burner, a source of liquid fuel supply, a liquid fuel control device, connections between the fuel supply and burner for supplying fuel to the burner, said connections including the fuel control device, means whereby between the fuel control device and burner a portion of said connections shall remain normally unfilled with the liquid fuel, and means permitting visual inspection of the liquid fuel passing through said unfilled section.

4. In a mechanism of the character described, a burner, a source of liquid fuel supply, a liquid fuel control device, connections leading from the source of fuel supply to the burner and including the fuel control device therein, means whereby a portion of said connection between the fuel control device and burner is maintained in unfilled condition and permits fuel to drop freely therethrough, and a transparent section formed in said unfilled section permitting visual inspection of the falling fuel therethrough.

5. In a mechanism of the character described, a burner, a source of liquid fuel supply, a liquid fuel control device, connections between the fuel supply and fuel control device and between the fuel control device and burner for conducting liquid fuel to the burner through the fuel control device, said connections between the fuel control device and burner including a section above the burner and a section below the burner, said first section being unfilled with fuel and through which it drops by gravity, and said second section being normally filled with fuel for supplying immediately to the burner, means included in the fuel control device for obstructing the free flow of fuel therethrough, and means for regulating the degree of obstruction to the flow, said regulating means acting automatically with variations in temperature.

6. In a mechanism of the character described, a liquid fuel control device adapted to be located in a conduit between a source of liquid fuel supply and a burner, said device including means to control the passage of fuel therethrough located at a relatively high plane and above the fuel burning level of the burner, means expanding and contracting with variations in temperature located at a relatively lower plane whereby said means may be positioned immediately above the floor and in the open area of a room, operative connections extending between said control means and said temperature affected means whereby the control means is governed by the latter means, and a conduit located between the fuel control device and burner comprising a substantially vertical section unfilled with fuel and a substantially horizontal section adjacent the burner normally filled with liquid fuel, substantially as described.

7. In a mechanism of the character described, a liquid fuel control device including means to control the passage of liquid fuel therethrough located at a relatively high plane, a burner located in a plane below said fuel control device, a connecting conduit leading from the fuel control device to the burner, a portion of said conduit being located level with or below the burner and the remainder above the plane of the burner, whereby when fuel is passed through the fuel control device to the burner said first mentioned portion will be filled with fuel and said second portion will be unfilled, and means permitting visual examination of the fuel passing through said second portion to the first portion of the conduit.

8. In a mechanism of the character described, a liquid fuel control device adapted to be located in a conduit between a source of liquid fuel supply and a burner, said fuel control device comprising a casing having upper and lower chambers, passageways between said chambers permitting the passage of liquid fuel at normal atmospheric pressure and temperature from the lower to the upper chamber, passages leading from said upper chamber to a conduit, means partially closing a passage from the lower to the upper chamber, said means being manually operable, and means obstructing the other passage from the lower to the upper chamber, said means having operative connection with means affected by changes in temperature to thereby automatically control the passage of fuel through said passage.

9. In a mechanism of the character described, a liquid fuel control device adapted to be located in a conduit between a source of liquid fuel supply and a burner, said liquid fuel control device comprising a casing provided with upper and lower chambers, a passageway therebetween permitting the passage of liquid fuel from the lower to the upper chamber, means whereby liquid fuel from the upper chamber may be carried through gravity to the conduit, means to control the flow of fuel from the lower to the upper chamber, said means having operative connection with a temperature affected medium whereby the fuel will be automatically stopped from passing through said passageway upon attainment of a predetermined degree of temperature, said liquid fuel in its passage from the source of supply to the burner being maintained at ordinary temperature.

10. In a mechanism of the character described, a fuel control device adapted to be located in a conduit between a source of fuel supply and a burner, said fuel control device comprising a casing provided with upper and lower chambers, a passageway therebetween permitting the passage of fuel from the lower to the upper chamber, means whereby the fuel from the upper chamber may be carried to the conduit, means to control the flow of fuel from the lower to the upper chamber comprising a valve entered into said passageway, means tending to elevate the valve, a lever pivoted to act on the valve to press it in the passageway or to permit its elevation, and means to operate the lever comprising a temperature affected medium operatively connected therewith whereby when the temperature increases the lever is operated to press the valve into the passageway and obstruct the flow of fuel therethrough.

11. In a mechanism of the character described a fuel control device adapted to be located in a conduit between a source of fuel supply and a burner, said fuel control device comprising a casing provided with upper and lower chambers, a passageway therebetween permitting the passage of fuel from the lower to the upper chamber, means whereby the fuel from the upper chamber may be carried to the conduit, means to control the flow of fuel from the lower to the upper chamber comprising an element entered into the passageway, means tending to elevate said element, a lever associated with said element to control its movements, means to adjust the lever to thereby give the said element a greater range of movement, and automatic means to operate the lever comprising a temperature affected medium operatively connected therewith the expansion and contraction thereof controlling the movements of the lever.

In testimony whereof, I have hereunto affixed my signature in the presence of two witnesses.

WILLIS J. PERKINS.

Witnesses:
C. A. LAWTON,
PETER TAYLOR.